Feb. 25, 1947. T. R. JONES 2,416,586
FLOATING TOOL HOLDER
Filed May 13, 1944
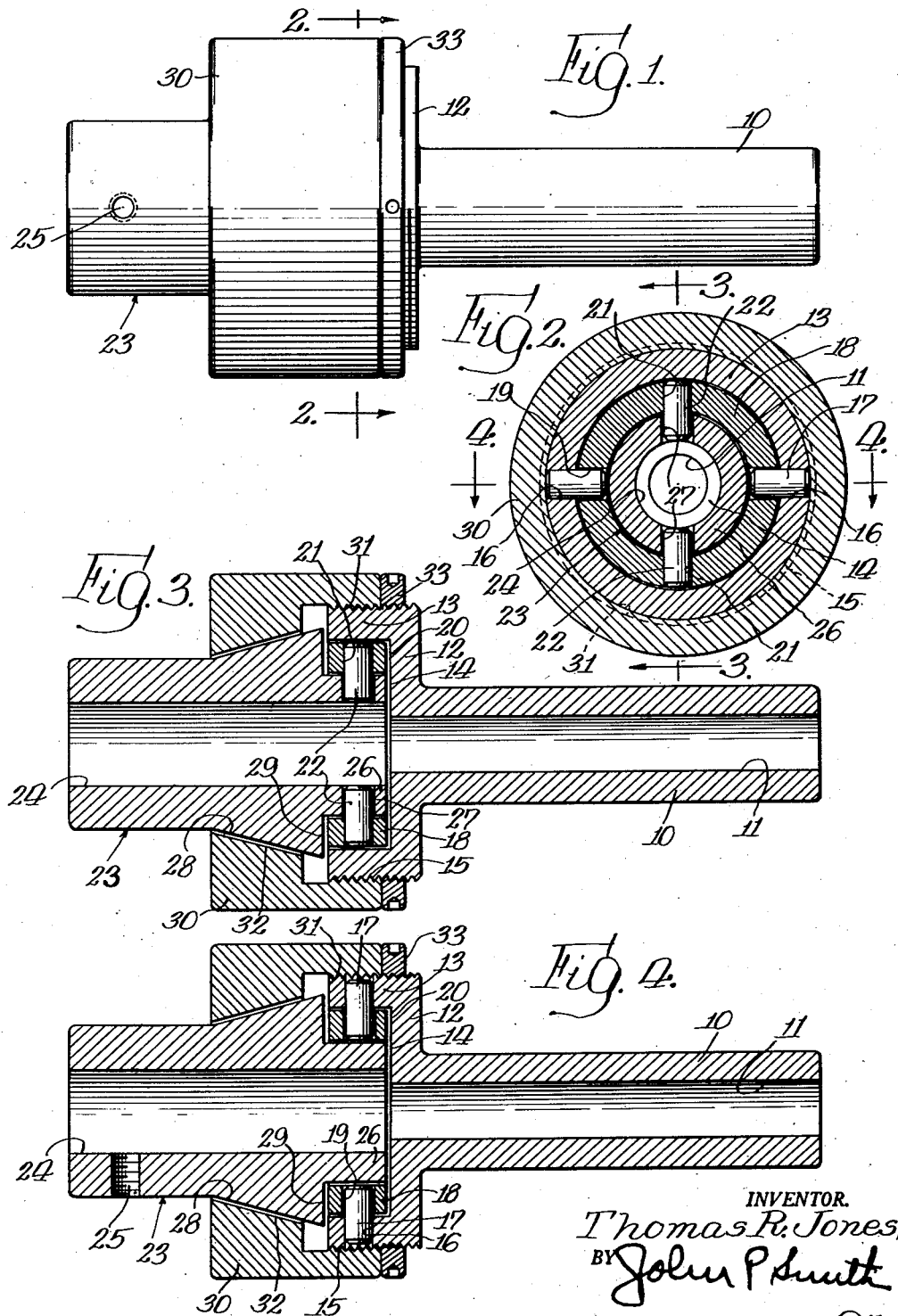
INVENTOR.
Thomas R. Jones,
BY John P Smith
Atty.

Patented Feb. 25, 1947

2,416,586

UNITED STATES PATENT OFFICE 2,416,586

FLOATING TOOLHOLDER

Thomas R. Jones, Chicago, Ill., assignor of one-fifth to John P. Smith, Oak Park, Ill.

Application May 13, 1944, Serial No. 535,519

20 Claims. (Cl. 279—16)

The present invention relates generally to a floating tool holder, but more particularly to a novel, improved and simplified construction of holder which is adapted to support a tool such as a reamer, a drill, a tap or other similar tool on the live or dead spindle of a lathe, drill press, multiple spindles of a turret lathe or other similar machines so that the tool supported therein may have an angular or bodily floating action with respect to the tool holder under all operating conditions.

In all tool holders heretofore constructed various means have been employed to permit the tool carried by the tool holder to angularly and bodily displace itself with respect to the tool holder in aligning itself with the work during the entrance of the tool into the work, but none of these tool holders heretofore constructed have been capable of properly functioning so as to permit the free movement of the tool with respect to the holder during its withdrawal from the work with the result that when such tool holder is used in connection with a tap, for example, for threading a hole in the work, the threads thus formed become mutilated on the withdrawal of the tool, since the conventional tool holder does not function to permit the tool to properly position itself on the withdrawal operation. While this disadvantage of the conventional tool holder is principally found in connection with the use of tools such as a tap for threading a hole, it also occurs in connection with the withdrawal of the reamer and drill and in some instances, very often requires a special grinding of reamers and drills to partly overcome this difficulty. Such special grinding ruins the tools for accurate work. It is therefore the primary object of the present invention to not only overcome these difficulties, but to also provide a novel, improved and simplified tool holder which will permit the free floating angularly or bodily of the tool on the withdrawal operation of the tool from the work as well as the entering of the tool into the work.

A further object of the invention is to provide a novel, improved and simplified construction of a floating tool holder for supporting a tool on the live or dead spindle of a machine whereby the tool may float angularly or bodily with respect to the holder when the tool is being forced into the work or being withdrawn from the work. The latter action is especially essential in withdrawing a tool such as a tap from the work in preventing the mutilation of the threaded hole during this operation of the machines.

A still further object of the invention is to provide a novel, improved and simplified construction of a floating tool holder whereby the tool is free under all operating conditions to angularly or bodily displace itself with respect to the holder, i. e., during its entrance into the work or its withdrawal from the work.

Another object of the invention is to provide a novel and simplified construction of a continuously operable tool holder for supporting a variety of tools thereon and having an adjustment whereby the angular or bodily displacement of the tool with respect to the holder may be regulated or controlled.

The present invention is an improvement on the construction disclosed in my Patent No. 2,399,807, issued May 7, 1946.

The above and other objects are accomplished by providing a construction and an arrangement of the various parts in the manner hereinafter described and particularly pointed out in the appended claims.

Referring to the drawings:

Fig. 1 is a top plan view of my improved tool holder;

Fig. 2 is a vertical cross sectional view taken on the line 2—2 in Fig. 1;

Fig. 3 is a longitudinal cross sectional view taken on the line 3—3; and

Fig. 4 is a fragmentary cross sectional view taken on the line 4—4 in Fig. 2.

In illustrating one form of my invention, I have shown the same as comprising a main drive member or shank 10 which is adapted to be secured to the chuck of the live or dead spindle of an automatic screw machine, turret lathe or the like machines. This drive member has a longitudinal bore 11 in the center thereof. Formed on one side of the drive member 10 is a radially projecting flange 12. Formed integrally with the radial flange portion 12 is an annular or concentrically arranged sleeve portion 13, forming in effect a circular or disc-like recess 14 on one end of the drive member 10. The outer periphery of the annular sleeve 13 is provided with threads as shown at 15 for the purpose hereinafter set forth. Located in the opposite walls and in diametral alignment of the annular portion 13 of the drive member 10, are apertures 16 in which are securely fitted by means of a driving fit, radial pins or fulcrums 17. Mounted within this annular recess or cavity 14 of the drive member 10 is an intermediate member or ring 18. This ring 18 is provided with diametral and oppositely disposed apertures 19 which are adapted to receive the pins 17. This ring is rockable upon the pins 17 as a fulcrum and can reciprocate in a rectilinear direction on and parallel to the axes of these pins. The intermediate member or ring 18 is of a relatively smaller diameter than the annular recess 14 so that in addition to the ring being capable of fulcruming on the pins 17, can also reciprocate bodily in a rectilinear direction parallel to the axes of the pins 17. In this connection it will also be noted that the ring 18 is spaced from the face or bottom of the annular recess 14 as shown at 20 so as to permit the ring to rock on the pins 17 as a fulcrum. Located at right angles to the opposite apertures 19 in the ring or intermediate member 18 are diametral and oppositely aligned apertures 21 in which are fixed or driven therein aligned pins or fulcrums 22. The axes of all these pins 17 and 22 are located in the same transverse plane. The pins 22 extend inwardly from the ring or intermediate member 18 and form a pivot or fulcrum for the driven member or sleeve generally indicated by the reference character 23. The driven member has a longitudinal bore therein as shown at 24 for receiving and holding therein a tool such as a tap, a reamer or a drill or similar instrument. The sleeve 23 is provided with a threaded aperture 25 which is adapted to receive a threaded set screw for securing the tool in place on the sleeve. The inner end of this sleeve or driven member 23 has a reduced barrel portion as shown at 26 whose outer diameter is relatively smaller than the inner diameter of the ring or intermediate member 18. This barrel portion 26 of the driven member 23 has aligned diametral apertures 27 in which the opposite fulcrums or pins 22 are seated for permitting the sleeve or driven member to fulcrum or rock or reciprocate on these pins. To state it in other words, the sleeve or driven member 23 may slide over the inner ends of the pins 22 in a direction parallel to the axes of these pins and within the limits between the diameter of the barrel portion 26 and the inner diameter of the ring 18 and at the same time, the driven member may rock or fulcrum about these pins 22 as it pivots within the limit of the spacing between these movable parts. The sliding movement of the ring 18 and driven member 23 on the respective fulcrum pins 17 and 22 permits the bodily displacement of the driven member 23 with respect to the drive member 10. The rocking movement of the members 18 and 23 on these same pins permits angular displacement of the driven member 23 with respect to the drive member 10. An intermediate portion of the sleeve or driven member 23 is beveled or in conically shaped form, as shown at 28, which gradually enlarges towards its inner end and terminates in a transverse surface or plane as shown at 29.

Embracing the operative parts or members and providing means for adjusting or varying the floating movements both angularly and bodily of the driven member or sleeve 23 with respect to the shank or drive member 10 is a cap or encasing member 30. The encasing member has an internally threaded portion as shown at 31 which is adapted to engage in threaded engagement therewith the threaded portion 15 formed on the periphery of the flange of the drive member 10. The other portion of the cap or encasing member 30 has a conically shaped portion 32 which is complementary to and coincides with the conically shaped portion 28 of the sleeve or driven member 23. It will be obvious that by adjusting the cap or encasing member 30 with respect to the shank or drive member 10, the floating action of the driven member 23 may be regulated to a degree consistent with the job to be performed by the tool and when properly adjusted, may be locked in its adjusted position by a locking ring 33 which is mounted in threaded engagement with the external threaded portion 15 of the shank or drive member 10.

From the above description it will be readily seen that when the shank or drive member 10 is mounted on the live or dead spindle of the machine and the tool secured in position in the bore 24 of the driven member or sleeve 23 and when the foremost end of the tool is brought into contact with the work, the tool may angularly or bodily displace itself or may employ a combination of the two movements with respect to the shank or holder 10 in properly aligning the tool with the work. This is accomplished by the right angularly positioned pins whose axes are located in substantially the same transverse plane. These pins in effect form a fulcrum on which the respective members 18 and 23 may fulcrum or rock on the respective aligned pins 17 and 22 and at the same time these same members may shift radially on their respective pins so as to permit body displacement of the tool and driven member 23 in any direction with respect to the shank or drive member 10. In this connection it is also pointed out that the tool holder functions with equal efficiency in permitting free angular or bodily displacement of the tool with respect to the work on the withdrawal of the tool from the work as well as in the operation of the tool when it is entering the work, since this particular construction functions with the same efficiency and ease of operation whether the thrust on the tool holder is on the forward or withdrawal operation. To state it in other words, the pins 17 and 22 perform three operational functions, i. e., forming the driving connection between the drive member 10 and the driven member 23. They also form the fulcrums for the respective members 18 and 23 so that the driven members 23 may angularly displace itself in any direction with respect to the drive member 10. The pins also perform the function of permitting the driven member 23 to bodily displace itself in any direction with respect to the drive member 10 by permitting the respective members 18 and 23 to slide over the respective inner ends of these pins. This arrangement and construction of tool holder permits the free floating of the tool held therein regardless of whether there is an inward or outward thrust on the tool. Should the operator desire to reduce the angular or bodily displacement of the driven member 23 with respect to the drive member 10, the encasing cap 30 may be adjusted on the threaded portion on the drive member to reduce or vary the limits of displacement, such adjustment can then be secured by the lock nut or ring 33.

From the above description it will be readily seen that I have not only provided a novel, improved and compact as well as simplified construction of tool holder, but have also provided one which will work with as equal efficiency and facility of operation on the withdrawal of the tool as it does on the entering of the tool in performing its work. This not only eliminates the unsatisfactory practice of specially grinding tools for performing their normal function, but eliminates scarred work as well as the mutilation of threaded or plain holes, which is often caused by the failure of the tool holder to function on the withdrawal of the tap or other tool from the work. The present improved tool holder by being capable of functioning on the withdrawal as well as the entering of the tool into the work, not only eliminates special grinding of the tool such as tapering a reamer or drill, but also prevents breakage of tools and prolongs the life of the tool since the full length of the tool can be used when special tapering is eliminated.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. A tool holder comprising a drive member, a driven member, and means including diametrally supported pins for connecting said drive and driven member together whereby said driven member may freely displace itself bodily and angularly with respect to said drive member on an inward or outward thrust on said driven member.

2. A tool holder comprising a drive member, a driven member, radially projecting pins carried by said drive member, an intermediate member slidably and pivotally mounted on said pins, radially projecting pins carried by said intermediate member and slidably and pivotally related to said driven member, whereby said driven member may freely displace itself with respect to said drive member on an inward and outward thrust on one of said members.

3. A tool holder comprising a drive member, a driven member, an intermediate member positioned between said drive and driven members, and fulcrum members positioned between said intermediate member and the respective drive and driven members, the axes of said fulcrum members intersecting one another and intersecting the longitudinal axis of said drive member, said driven and intermediate members being pivotally mounted and movable on the respective fulcrums in substantially a radial direction with respect to said drive member whereby said driven member may bodily and angularly displace itself with respect to said drive member on an inward or outward thrust on said driven member.

4. A tool holder comprising a drive member, a driven member, an intermediate member positioned between said drive and driven members, means for connecting said ring to said driven member for permitting diametral displacement of said driven member with respect to said ring, means for connecting said ring to said drive member for permitting diametral displacement of said ring with respect to said drive member in a direction at right angles to said first named displacement, said first and second named means forming the pivotal connections between said ring and said driven and drive members respectively.

5. A tool holder comprising a drive member, a driven member, an intermediate member positioned between said drive and driven members, and two diametrally positioned pins whose axes are located in substantially the same transverse plane and positioned between said intermediate member and the respective drive and driven members said driven and intermediate members being pivotally mounted and movable on the respective pins in radial directions with respect to said drive member whereby said driven member may bodily and angularly displace itself with respect to said drive member on an inward or outward thrust on said driven member.

6. A tool holder comprising a drive member, a driven member, means for supporting a tool on said driven member, and means including right angularly arranged sets of diametrally supported pins for forming pivoted and driving connection between said members, said driven member being slidably movable on the longitudinal axes of all of said pins for permitting bodily displacement of said driven member with respect to said drive member.

7. A tool holder comprising a drive member, a driven member, diametral pins carried by said drive member, an intermediate member reciprocally and pivotally mounted on said pins, and diametral pins located at right angles with respect to said first named pins and carried by said intermediate member, said driven member being reciprocally and pivotally mounted on said second named pins whereby said driven member may angularly and bodily displace itself with respect to said drive member.

8. A tool holder comprising a drive member, a driven member, and means including right angularly arranged pins whose axes are located in a substantially common transverse plane between said members for forming the driving connection therebetween and permitting angular and bodily displacement of said driven member with respect to said drive member.

9. A tool holder comprising a drive member, a driven member, a set of radially and inwardly projecting pins secured to said drive member, an intermediate member mounted on and movable longitudinally of the axes of said pins, a second set of radially and inwardly projecting pins secured to said last named member and arranged at right angles with respect to said first named pins, said driven member being supported on and longitudinally movable of the axes of said second named pins, whereby said driven member may angularly and bodily displace itself with respect to said drive member.

10. A tool holder comprising a longitudinally extending drive member having a circular recess in one end thereof, a ring mounted in said recess and movable in a direction of the diameter thereof, oppositely disposed radial pins carried by said drive member for supporting said ring and permitting diametral and pivotal displacement of said ring on said pins, a driven member having one end thereof extending into the opening in said ring and movable in a direction of the diameter of said ring, and oppositely disposed radial pins carried by said ring for supporting said driven member and permitting diametral and pivoted displacement of said driven member with respect to said ring, whereby said driven member may angularly and bodily displace itself with respect to said drive member.

11. A tool holder comprising a drive member, a driven member, means positioned between said members including a ring member, and means located in substantially the same plane and extending radially with respect to said ring member and connected respectively to said drive and driven members for forming the driving connections therebetween, said driven and ring members being pivoted on said last named means and eccentrically displaceable with respect to said drive member for permitting angular and bodily displacement of said driven member with respect to said drive member.

12. A tool holder comprising a drive member, a driven member, means for operatively connecting said members together including a transversely movable and pivotally mounted ring, a pair of aligned fulcrum pins extending radially with respect to said ring and connected to said drive member, and a second pair of aligned fulcrum pins extending radially with respect to said ring and connected to said driven member said first named pair of pins arranged at right angles with respect to said second named pair whereby said driven member may angularly and bodily displace itself with respect to said driven member.

13. A tool holder comprising a substantially cylindrical and longitudinally extending drive member, a substantially cylindrical and longitudinally extending driven member movable bodily in a direction transversely with respect to said drive member and movable angularly in a universal direction with respect to said drive member, a ring between said drive and driven member, and four right angularly spaced apart radially extending pins carried by said ring and connected to said drive and driven member for floatingly connecting said drive and driven members together.

14. A tool holder comprising a drive member, a driven member, means for operatively connecting said members together including a ring, a pair of aligned fulcrum pins rigidly secured to and extending radially with respect to said ring, said driven member being mounted on said pins for transverse and pivotal movement thereon, a second pair of aligned fulcrum pins rigidly secured to and extending radially with respect to said drive member, said ring being mounted on said last named pair of pins for transverse and pivotal movement thereon, whereby said driven member may bodily and angularly dispose itself with respect to said drive member, the axes of all of said pins being located in substantially the same transverse plane.

15. A tool holder comprising a drive member, a driven member, means forming a transverse and angularly movable connection between said members including a ring member, a pair of aligned fulcrum pins secured to and extending radially with respect to said ring member, and a second pair of aligned fulcrum members extending radially with respect to said ring member and secured to said driven member whereby said driven member may angularly and bodily displace itself with respect to said driven member on an inward or outward thrust on said tool holder.

16. A tool holder comprising a drive member, a driven member, means for operatively connecting said members together including a ring member, a pair of aligned fulcrum pins extending radially with respect to said ring member, a second pair of aligned fulcrum members extending radially with respect to said ring member and connected to said driven member whereby said driven member may angularly and bodily displace itself with respect to said driven member on an inward or outward thrust on said tool holder, and adjustable means mounted on said drive members and engageable with said driven member for varying the limits of movement of said driven member with respect to said drive member.

17. A tool holder comprising a drive member, a driven member, means for operatively connecting said members together including a ring member, a pair of aligned fulcrum pins extending radially with respect to said ring member and connected with said drive member, a second pair of aligned fulcrum members extending radially with respect to said ring member and connected to said driven member whereby said driven member may angularly and bodily displace itself with respect to said driven member on an inward or outward thrust on said tool holder, and an encasing cap mounted in threaded engagement with said drive member and having a bevelled face complementary to a corresponding bevelled face on said driven member whereby the limits of movement of said driven member may be varied with respect to said drive member.

18. A tool holder comprising a drive member, a driven member, means positioned between said members including a ring member, means extending radially with respect to said ring member and connected respectively to said drive and driven members for forming the driving connection therebetween and for permitting angular and bodily displacement of said driven member with respect to said drive member, and an adjustable means mounted on said drive member and engageable with said driven member for varying limits of movement of said driven member with respect to said drive member.

19. A tool holder comprising a drive member, a driven member, means for operatively connecting said members together including an intermediate member, means extending radially with respect to said intermediate member and connected respectively to said drive and driven members for forming the driving connection therebetween and for permitting angular and bodily displacement of said driven member with respect to said drive member, and an encasing member adjustably mounted on said drive member and engageable with said driven member for varying the limits of movement of said driven member with respect to said drive member.

20. A tool holder comprising a drive member, a driven member, means forming the driving connection between said members including an annular member, oppositely aligned pins secured to said drive member forming the fulcrum for said annular member and for permitting bodily displacement of said annular member with respect to said drive member, oppositely aligned pins secured to said driven member and journaled on said annular member for forming the fulcrum for said driven member and for permitting bodily displacement of said driven member with respect to said annular member, said driven member having a bevelled face thereon, and an adjustable encasing member mounted in threaded engagement with said drive member and having a complementary bevelled face engageable with said first named bevelled face for varying the limits of movement of said driven member with respect to said drive member.

THOMAS R. JONES.

REFERENCES CITED

The following references are of record in the file of this patent:

UNITED STATES PATENTS

| Number | Name | Date |
|---|---|---|
| 2,108,699 | Walther | Feb. 15, 1938 |
| 203,155 | Hunter et al. | Apr. 30, 1878 |
| 1,377,663 | Brown et al. | May 10, 1921 |
| 2,068,495 | Lamb | Jan. 19, 1937 |
| 1,431,830 | Miller | Oct. 10, 1922 |